UNITED STATES PATENT OFFICE.

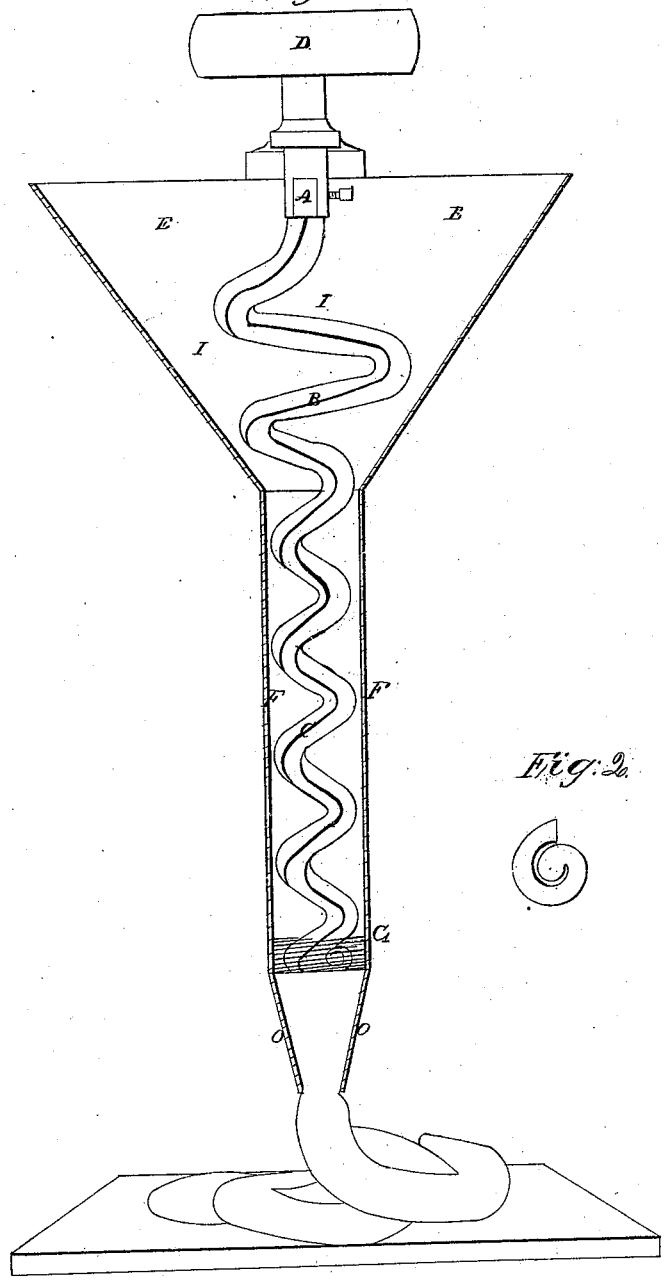

HOSEA BALL, OF CINCINNATI, OHIO.

MIXING OR BREAKING DOUGH.

Specification of Letters Patent No. 4,981, dated February 27, 1847.

*To all whom it may concern:*

Be it known that I, HOSEA BALL, of Cincinnati, in the county of Hamilton and State of Ohio, have invented a new and useful machine for mixing and breaking dough, mixing putty, stuffing sausages, and other purposes, to be called a "dough-breaker;" and I do hereby declare that the following is a full, clear, and exact description of the construction and operation of the same, reference being had to the annexed drawings, making a part of this specification, in which—

Figure 1, is a perspective view of the invention, showing the breaker, or worm, as it acts, in the hopper and tube, in mixing and breaking the dough. Fig. 2 is an end view of the breaker, where the dough is discharged from the tube.
The construction and operation of the machine are as follows, viz: The breaker works in a perpendicular position in the hopper and tube, as seen in Fig. 1. It may be driven by steam, or any other power. It is made of square wrought iron, in a coil, as seen in Fig. 1, letters B and C. It is attached to a spindle, at the top, by means of a pin, or set-screw, as seen in Fig. 1, letter A. It is turned by a pulley, or other fixture, according to the power that is to be applied. Fig. 1, letter D, is the pulley. The coil of the breaker, in the hopper, above the tube, is expanded to correspond with the hopper, as seen in Fig. 1, letter B. The object of this is, to force the wet flour into the tube. The end of the breaker, when the dough is discharged, as seen in Fig. 2, is a close coil, nearly filling the tube, leaving only a small aperture around it, but, when it is designed only for stuffing sausages this coil may be omitted.

Fig. 1, letters E E, show the hopper; and F F the tube; both of which are made of cast iron. At the bottom of the tube, letters O O, show an inverted conical attachment, fastened to the bottom of the tube by means of a screw, or otherwise, as seen, letter G. This attachment is used or not, at pleasure. Its use is to hold back the dough from discharging too rapidly when very moist. When used for stuffing sausages a suitable pipe is fitted to this cone; also, for such use, the breaker, or coil is made of flat wrought iron.

In using the breaker, the proper quantity of liquid is put with the flour and feed into the hopper, as seen at I, I, Fig. 1, and is carried rapidly through the tube—broken and mixed thoroughly.

I claim—

The combination of the breaker or worm with the funnel and tube in the manner, and for the purpose described.

Philadelphia, Penn., Oct. 10, 1846.

HOSEA BALL.

Witnesses:
   GEO. STORRS,
   GEO. F. STORRS.